(12) United States Patent
Derrick, II

(10) Patent No.: US 11,279,501 B2
(45) Date of Patent: Mar. 22, 2022

(54) SATELLITE ATTITUDE CONTROL SYSTEM USING EIGEN VECTOR, NON-LINEAR DYNAMIC INVERSION, AND FEEDFORWARD CONTROL

(71) Applicant: GENERAL ATOMICS, San Diego, CA (US)

(72) Inventor: John Benton Derrick, II, Madison, AL (US)

(73) Assignee: General Atomics, San Diego, CA (US)

(*) Notice: Subject to any disclaimer, the term of this patent is extended or adjusted under 35 U.S.C. 154(b) by 308 days.

(21) Appl. No.: 16/170,157

(22) Filed: Oct. 25, 2018

(65) Prior Publication Data
US 2020/0130869 A1  Apr. 30, 2020

(51) Int. Cl.
*B64G 1/28* (2006.01)
*B64G 1/24* (2006.01)

(52) U.S. Cl.
CPC .......... *B64G 1/283* (2013.01); *B64G 1/244* (2019.05); *B64G 2001/245* (2013.01)

(58) Field of Classification Search
CPC .. B64G 1/283; B64G 1/244; B64G 2001/245; B64G 1/00; B64G 1/002; B64G 1/10; B64G 1/14; B64G 1/16; B64G 1/22; B64G 2700/00; B64G 2700/24; B64G 2700/66; B64G 1/285; B64G 1/286; B64G 1/288; G05D 1/0808; B60L 2240/622
See application file for complete search history.

(56) References Cited

U.S. PATENT DOCUMENTS

| | | | | |
|---|---|---|---|---|
| 3,460,096 A | * | 8/1969 | Barron | G05B 13/02 700/32 |
| 4,916,622 A | * | 4/1990 | Raman | B64G 1/285 701/13 |
| 5,100,084 A | * | 3/1992 | Rahn | B64G 1/36 244/165 |

(Continued)

FOREIGN PATENT DOCUMENTS

| | | |
|---|---|---|
| EP | 0926066 | 6/1999 |
| JP | 2001260996 | 9/2001 |

(Continued)

OTHER PUBLICATIONS

Weerdt, de E., "Adaptive Nonlinear Dynamic Inversion for Spacecraft Attitude Control with Fuel Sloshing", Aug. 2008, AIAA Guidance, Navigation and Control Conference and Exhibit.*

(Continued)

*Primary Examiner* — Christian Chace
*Assistant Examiner* — Aaron C Smith
(74) *Attorney, Agent, or Firm* — Fitch, Even, Tabin & Flannery LLP

(57) ABSTRACT

Systems and methods are described for a satellite control system that exhibits improved stability and increased efficiency by implementing a non-linear dynamic inversion inner-loop control algorithm coupled with an eigen vector outer-loop control algorithm. Thus, the attitude determination and control system (ADACS) may operate using commands to rotate directly about an eigen vector. Additionally, the outer-loop control system includes a feed-forward control element to enhance pointing accuracy when tracking moving targets.

39 Claims, 6 Drawing Sheets

(56) References Cited

U.S. PATENT DOCUMENTS

| | | | | |
|---|---|---|---|---|
| 5,667,171 | A * | 9/1997 | Fowell | B64G 1/36 244/165 |
| 6,463,365 | B1 * | 10/2002 | Anagnost | B64G 1/281 244/164 |
| 7,097,140 | B2 * | 8/2006 | Staley | B64G 1/28 244/165 |
| 9,745,082 | B2 | 8/2017 | Lim | |
| 2002/0040950 | A1 | 4/2002 | Staley | |
| 2004/0243332 | A1 * | 12/2004 | Shen | G01H 1/003 702/85 |
| 2006/0022091 | A1 * | 2/2006 | Peck | B64G 1/244 244/165 |
| 2010/0140413 | A1 * | 6/2010 | Bailey | B64G 1/244 244/165 |
| 2012/0325970 | A1 * | 12/2012 | Hamilton | B64G 1/244 244/165 |
| 2017/0269610 | A1 * | 9/2017 | Weiss | B64G 1/286 |
| 2019/0367191 | A1 * | 12/2019 | Wasson | B64G 1/52 |

FOREIGN PATENT DOCUMENTS

| | | |
|---|---|---|
| WO | 2017159156 | 9/2017 |
| WO | 2018089898 | 5/2018 |

OTHER PUBLICATIONS

Chris Hall, Attitude Determination, Mar. 18, 2003 (Year: 2003).*

Giulio Avanzini, Spacecraft Attitude Dynamics and Control, Politecnico di Torino, 2008-2009 (Year: 2008).*

Bouwmeester, et al; "Design and Verification of a Very Compact and Versatile Attitude Determination and Control System for the Delfi-N3XT Nanosatellite"; The 4S Symposium 2012; 2012; 15 pages.

Li et al; "Design of Attitude Control System for CubeSat-Class Nanosatellite"; Journal of Control Science and Engineering; vol. 2013; Dec. 18, 2012; 15 pages.

Maryland Aerospace, Inc.; "MAI-400 MiniADACS System Operations Manual MILTEC ASVD Edition"; Mar. 17, 2014; 100 pages.

Mahdi; "Fuzzy PID Controller for Nano-Satellite Attitude Control"; Journal of Science and Arts; Year 2016, No. 4(37); Dec. 30, 2016; pp. 407-416.

EPO; Extended European Search Report for EP Application No. 19203064.1 mailed from the European Patent Office dated Mar. 17, 2020.

Patent Examination Report 1 issued in New Zealand Patent Application No. 757832 mailed from the New Zealand Intellectual Property Office dated Jul. 3, 2020.

Patent Examination Report 1 isued in Australian Patent Application No. 2019240665 mailed from the Australian Patent Office dated Oct. 15, 2020.

Office Action for Japan Patent Application No. 2019185086 mailed from the Japan Patent Office dated Mar. 1, 2021.

Costa et al; "Reentry Flight Controller Design Using Nonlinear Dynamic Inversion"; Journal of Spacecraft and Rockets; vol. 40, No. 1; Jan. 1, 2003; https://arc.aiaa.org/doi/abs/10.2514/2.3916.

Patent Examination Report 2 issued in New Zealand Patent Application No. 757832 mailed from the New Zealand Intellectual Property Office dated Feb. 9, 2021.

Communication pursuant to Article 94(3)EPC issued in EP Application No. 19203064.1 dated Apr. 30, 2021.

* cited by examiner

SATELLITE ATTITUDE CONTROL SYSTEM USING EIGEN VECTOR, NON-LINEAR DYNAMIC INVERSION, AND FEEDFORWARD CONTROL

BACKGROUND OF THE INVENTION

1. Field of the Invention

The present invention relates generally to orienting a satellite, and more specifically to orienting a satellite using eigen vector rotation and non-linear dynamic inversion.

2. Discussion of the Related Art

Various systems and processes are known in the art for orienting a satellite. Satellites may be controlled by a system known as an attitude determination and control system (ADACS). For example, an ADACS system may control the attitude, or orientation, of a satellite using reaction wheels that turn according to software algorithms executed on a computer within the satellite. In some cases, a satellite reaction wheel system may be characterized by dynamics that are highly non-linear.

Some control algorithms rely on linear control techniques such as a proportional-integral-derivative (PID) control to control the attitude of the satellite. Linear control systems applied to non-linear systems can exhibit oscillations, overshoots, and even instability. Additionally, some ADACS systems respond to pointing commands in a manner that resembles a yaw, pitch, and roll sequence. This method of maneuvering may be inefficient in terms of energy use and time.

SUMMARY

A method of orienting a satellite using eigen vector rotation and non-linear dynamic inversion is described. The method may include applying with a processing device a satellite orientation control system, the satellite orientation control system comprising a double feedback loop system, wherein a first loop executes to determine an eigen vector to rotate the satellite from one orientation to another, and a second loop that receives the eigen vector of the first loop as an input and executes a non-linear dynamic inversion algorithm to output a signal to at least one reaction wheel of the satellite, rotating the at least one reaction wheel in response to the output signal, and orienting the satellite based upon the rotation of the at least one reaction wheel.

An apparatus for orienting a satellite using eigen vector rotation and non-linear dynamic inversion is described. The apparatus may include a memory; a processor device in communication with the memory and configured to apply a satellite orientation control system, the satellite control system comprising a double feedback loop system, wherein a first loop executes to determine an eigen vector to rotate the satellite from one orientation to another, and a second loop that receives the eigen vector of the first loop as an input and executes a non-linear dynamic inversion algorithm to output a signal to at least one reaction wheel of the satellite; and rotate the at least one reaction wheel in response to the output signal; and orient the satellite based upon the rotation of the at least one reaction wheel.

A non-transitory computer readable medium storing code for orienting a satellite using eigen vector rotation and non-linear dynamic inversion is described. In some examples, the code comprises instructions executable by a processor to: determine an eigen vector to rotate the satellite from one orientation to another, execute a non-linear dynamic inversion algorithm to output a signal to at least one reaction wheel of the satellite, rotate the at least one reaction wheel in response to the output signal, and orient the satellite based upon the rotation of the at least one reaction wheel.

In some examples of the method, apparatus, and non-transitory computer-readable medium described above, the first loop further comprises receiving a desired orientation of the satellite and an estimated orientation of the satellite as inputs. In some examples of the method, apparatus, and non-transitory computer-readable medium described above, the first loop further comprises executing a satellite orientation error command based on the estimated orientation of the satellite and the desired orientation of the satellite.

In some examples of the method, apparatus, and non-transitory computer-readable medium described above, the eigen vector command executes to decompose the satellite orientation error command into a scalar component and a vector component. In some examples of the method, apparatus, and non-transitory computer-readable medium described above, the first loop further comprises a feed-forward control system.

In some examples of the method, apparatus, and non-transitory computer-readable medium described above, the feed-forward control system controls for timing errors between rotation of the at least one reaction wheel and pointing at a target.

In some examples of the method, apparatus, and non-transitory computer-readable medium described above, the feed-forward control system accounts for motion of tracking dishes, antennae, cameras, robotic arms, and solar arrays associated with the satellite. In some examples of the method, apparatus, and non-transitory computer-readable medium described above, the feed-forward control system further comprises receiving the desired orientation as an input.

In some examples of the method, apparatus, and non-transitory computer-readable medium described above, the second loop further comprises receiving the eigen vector determined from the first loop as an input. In some examples of the method, apparatus, and non-transitory computer-readable medium described above, the second loop further comprises receiving measured satellite rotation rates from a navigation system associated with the satellite.

In some examples of the method, apparatus, and non-transitory computer-readable medium described above, the second loop further comprises receiving a measured reaction wheel speed of the at least one reaction wheel from a rotation wheel tachometer associated with the satellite. In some examples of the method, apparatus, and non-transitory computer-readable medium described above, the second loop further comprises determining a desired rotational acceleration for the at least one reaction wheel. In some examples of the method, apparatus, and non-transitory computer-readable medium described above, the second loop further comprises receiving a mass moment of inertia tensor of at least one reaction wheel, a rotation axis vector of at least one reaction wheel, and a mass moment of inertia tensor of the satellite.

DETAILED DESCRIPTION

The following description is not to be taken in a limiting sense but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present disclosure provides a satellite control system that exhibits improved stability and increased efficiency by implementing a non-linear dynamic inversion inner-loop control algorithm coupled with an eigen vector outer-loop control algorithm. Thus, the attitude determination and control system (ADACS) system may operate using commands to rotate directly about an eigen vector (i.e., to go from one orientation directly to another). Additionally, the outer-loop control system is augmented with a feed-forward control element to enhance pointing accuracy when tracking moving targets.

Figure 1:
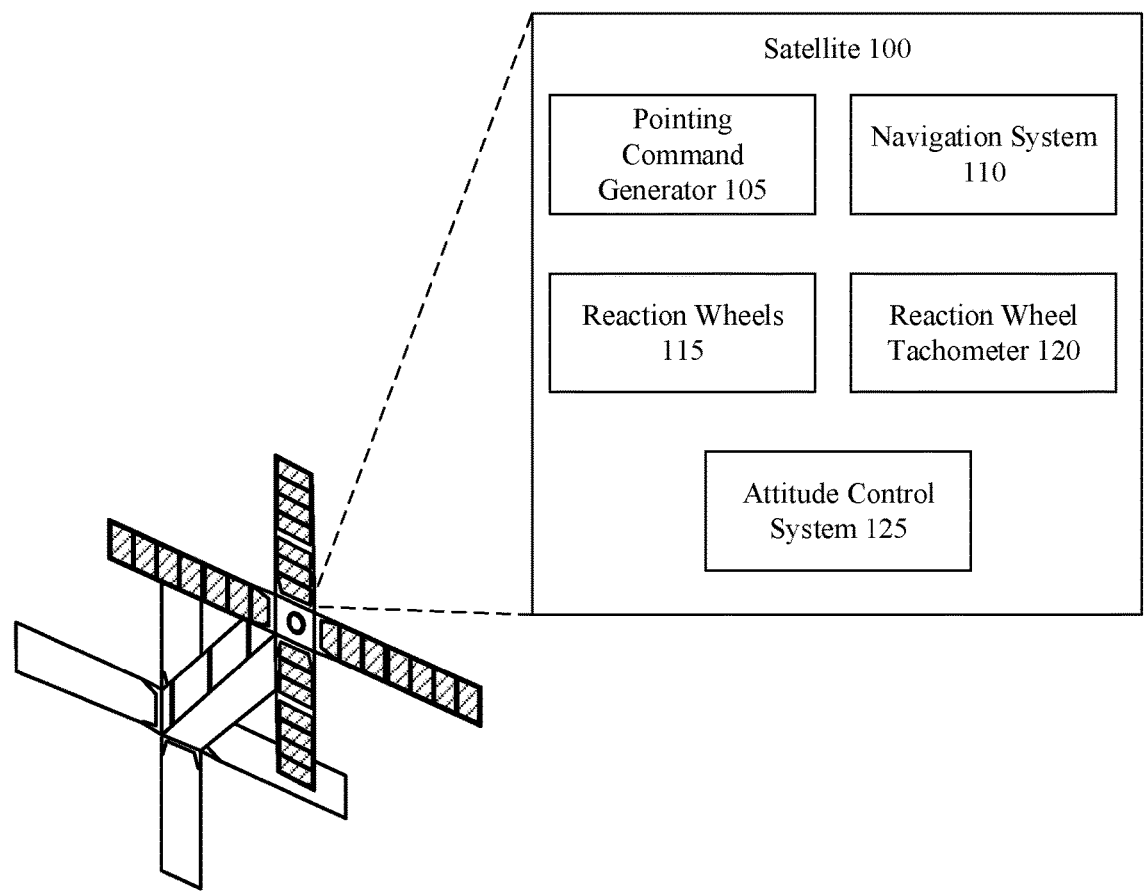
FIG. 1 shows an example of a satellite in accordance with aspects of the present disclosure.

FIG. 1 shows an example of a satellite 100 in accordance with aspects of the present disclosure. Satellite 100 may include a pointing command generator 105, navigation system 110, reaction wheels 115, a reaction wheel tachometer 120, and an attitude control system 125 (which may also be referred to as a satellite control system).

The attitude control system 125 may provide for stability and robustness over a wide range of operational modes and on-orbit conditions; smooth, quick, and accurate control system response to attitude commands; energy efficient operation to maximize battery life; ease of control system 125 setup; and ability to expand the control system's 125 use to large and complex satellites 100. The system 125 achieves these results by implementing an eigen vector outer-loop control algorithm, combined with a non-linear dynamic inversion inner-loop control algorithm. These results represent an improvement on existing satellite 100 control technology, but they are not a comprehensive list of features or advantages of the present system.

First, the outer loop of the attitude control system 125 utilizes an eigen vector outer-loop control algorithm. That is, between any two orientations of the satellite 100 attitude, there exists a rotation axis, called the eigen vector, which leads the satellite 100 directly from one orientation to the other. By rotating along this axis, the time and energy needed to complete the attitude maneuver may be minimized.

Secondly, the inner loop of the attitude control system 125 utilizes non-linear dynamic inversion control. The system accounts for stored momentum in the reaction wheels 115 and the satellite 100 which produces a smooth, uncoupled, linear response on a highly non-linear system. As an example, the reaction wheels 115 for the satellite 100 may have a top speed of 10,000 RPM. However, the satellite 100 may become uncontrollable once the reaction wheels 115 have 4,000 RPM of stored momentum due to the non-linear coupling of the satellite 100 control axes.

Also, the dynamic inversion control for the attitude control system 125 may be designed to work on satellites 100 with multiple reaction wheels 115 (e.g., more than 3) and with the reaction wheel spin axes orientated in any direction. This aspect of the control system 125 may also be used on advanced satellites 100 with redundant and skewed-axis reaction wheels 115. The system disclosed herein also takes into account cross coupling between the satellite 100 control axes and off-axis reaction wheels 115.

The dynamic inversion control for the attitude control system 125 may operate based on the following parameters: the number of reaction wheels 115, the mass moment of inertia of each reaction wheel, the mass moment of inertia tensor of the satellite 100 (including the reaction wheels 115), the coordinates of the unit vectors pointing along each reaction wheel's spin axis, the torque and speed limit of each reaction wheel, the satellite 100 attitude slew rate limit, and the closed-loop bandwidth of the rotational rate and attitude control loops.

A control system that only operates on proportional error feedback will result in the satellite 100 attitude lagging the desired orientation when the command is changing. Changing commands occur when the satellite 100 is attempting to track a moving target such as a point on the Earth's surface or to be aligned with the nadir orientation. The lagging response can result in significant steady-state pointing errors (e.g., approximately 10 degrees).

This steady-state error can be reduced or eliminated by adding an integral control algorithm. However, the attitude of the satellite 100 is two integrals away from the reaction wheel torque commands, and there is little natural damping of the system. These two aspects make integral control unappealing because any integral control will result in oscillations and overshoot of the attitude commands.

Feed-forward control can accomplish the goal of near zero steady-state error while not inducing unwanted oscillations and overshoot. The only trade-off is that these algorithms are somewhat more difficult to develop. Despite the additional developmental work, two different feed-forward control algorithms solve the lagging response problem. One feed-forward algorithm is designed for pointing vector control (e.g. earth position pointing), and a second feed-forward algorithm is designed for fully constrained attitude commands such as nadir pointing. It is desired to have a feed-forward control system that will perfectly track the attitude commands in the absence of modeling errors and disturbances.

The vector pointing feed-forward control algorithm tracks the rate of change of the pointing vector command by using cross products and dot product derivatives. The output of this algorithm is a body-frame rotational rate command that is sent directly into the inner-loop rotational rate control system. Simulation studies demonstrate that the Earth pointing error is reduced from approximately 10 degrees to less than 0.2 degrees with the use of this algorithm.

The fully-constrained attitude command feed-forward control algorithm first computes the time derivative of the quaternion attitude command. Quaternion math (i.e. products, conjugates, etc.) is used to convert the quaternion and quaternion derivative into a body-frame rotational rate command that is also sent directly into the inner-loop rotational rate control system. As was the case for the vector pointing feed-forward control algorithm, steady-state pointing error in the nadir pointing mode is virtually eliminated.

The control system inner loop may take the measured body rotational rates, the desired body rotational rates, and the measured reaction wheel speeds as inputs to produce desired reaction wheel rotational accelerations for the reaction wheels 115.

Pointing command generator 105 may be an example of, or include aspects of, the corresponding elements described with reference to FIG. 2. Navigation system 110 may be an example of, or include aspects of, the corresponding elements described with reference to FIGS. 2 and 4.

Reaction wheels 115 may rotate in response to the output signal generated by the outer loop. Reaction wheels 115 may also orient the satellite 100 based upon the rotation of the at least one reaction wheel 115. Reaction wheels 115 and the reaction wheel tachometer 120 may be an example of, or include aspects of, the corresponding elements described with reference to FIGS. 2 and 4.

Attitude control system 125 may be an example of, or include aspects of, the corresponding elements described with reference to FIG. 2.

Figure 2:
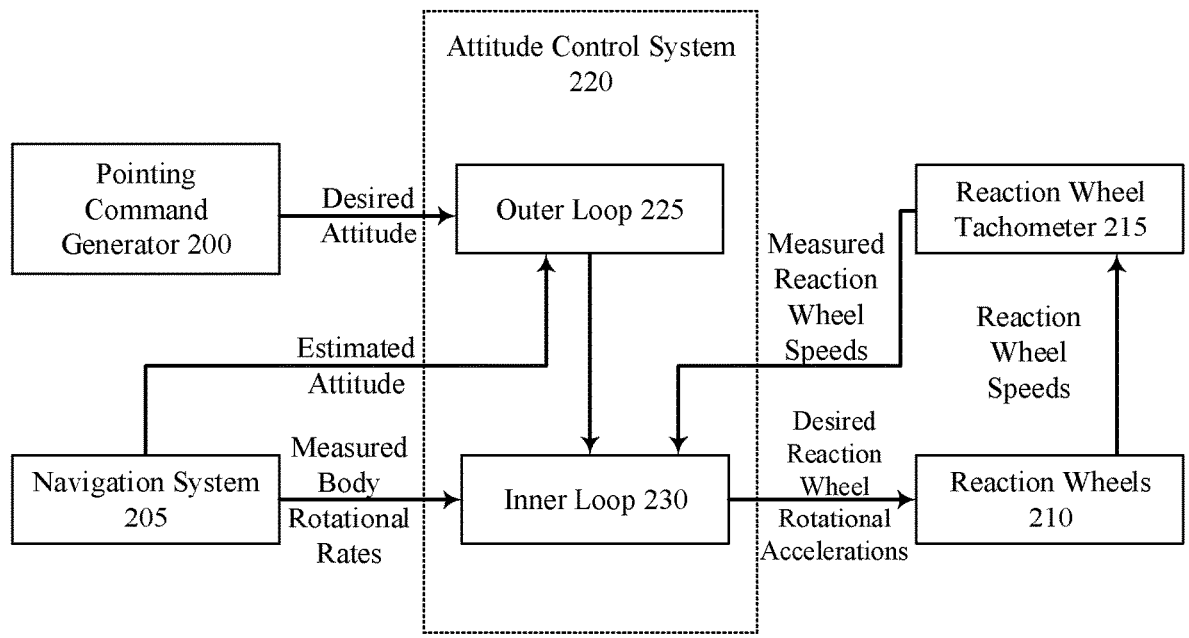
FIG. 2 shows an example of an attitude control system with dynamic inversion in accordance with aspects of the present disclosure.

FIG. 2 shows an example of an attitude control system 220 with dynamic inversion in accordance with aspects of the present disclosure. The example shown includes a pointing command generator 200, a navigation system 205, reaction wheels 210, a reaction wheel tachometer 215, and the attitude control system 220.

The pointing command generator 200 may provide a desired attitude for input to the attitude control system 220. The navigation system 205 may provide both an estimated attitude and measured body rotational rates as inputs to the attitude control system 220. The reaction wheel tachometer 215 may monitor the reaction wheels 210 and provide measured reaction wheel speeds for input to the attitude control system 220.

A control system outer loop 225 may take an estimated attitude and a desired attitude as inputs and produce desired body rotational rates. A control system inner loop 230 may take the measured body rotational rates, the desired body rotational rates, and the measured reaction wheel speeds as input to produce desired reaction wheel rotational accelerations for the reaction wheels 210.

Pointing command generator 200 may be an example of, or include aspects of, the corresponding elements described with reference to FIG. 1. Navigation system 205 may be an example of, or include aspects of, the corresponding elements described with reference to FIGS. 1 and 4.

Reaction wheels 210 and Reaction wheel tachometer 215 may be an example of, or include aspects of, the corresponding elements described with reference to FIGS. 1 and 4.

Attitude control system 220 may be an example of, or include aspects of, the corresponding elements described with reference to FIG. 1. Attitude control system 220 may include outer loop 225 and inner loop 230.

Outer loop 225 (also referred to as the first loop) may determine an eigen vector to rotate the satellite from one orientation to another. In some examples, the first loop further comprises receiving a desired orientation of the satellite and an estimated orientation of the satellite as inputs. In some examples, the first loop further comprises executing a satellite orientation error command based on the estimated orientation of the satellite and the desired orientation of the satellite. In some examples, the eigen vector command executes to decompose the satellite orientation error command into a scalar component and a vector component.

In some examples, the first loop further comprises a feed-forward control system. In some examples, the feed-forward control system controls for timing errors between rotation of the at least one reaction wheel and pointing at a target. In some examples, the feed-forward control system accounts for motion of tracking dishes, antennae, cameras, robotic arms, and solar arrays associated with the satellite. In some examples, the feed-forward control system further comprises receiving the desired orientation as an input.

Outer loop 225 may be an example of, or include aspects of, the corresponding elements described with reference to FIGS. 3 and 4.

Inner loop 230 (also referred to as the second loop) may execute a non-linear dynamic inversion algorithm to output a signal to at least one reaction wheel 210 of a satellite. In some examples, the second loop further comprises receiving the eigen vector determined from the first loop as an input. In some examples, the second loop further comprises receiving measured satellite rotation rates from a navigation system 205 associated with the satellite. In some examples, the second loop further comprises receiving a measured reaction wheel speed of the at least one reaction wheel from a rotation wheel tachometer associated with the satellite.

In some examples, the second loop further comprises determining a desired rotational acceleration for the at least one reaction wheel. In some examples, the second loop further comprises receiving a mass moment of inertia tensor of at least one reaction wheel, a rotation axis vector of at least one reaction wheel, and a mass moment of inertia tensor of the satellite.

Inner loop 230 may be an example of, or include aspects of, the corresponding elements described with reference to FIGS. 3 and 4.

Figure 3:
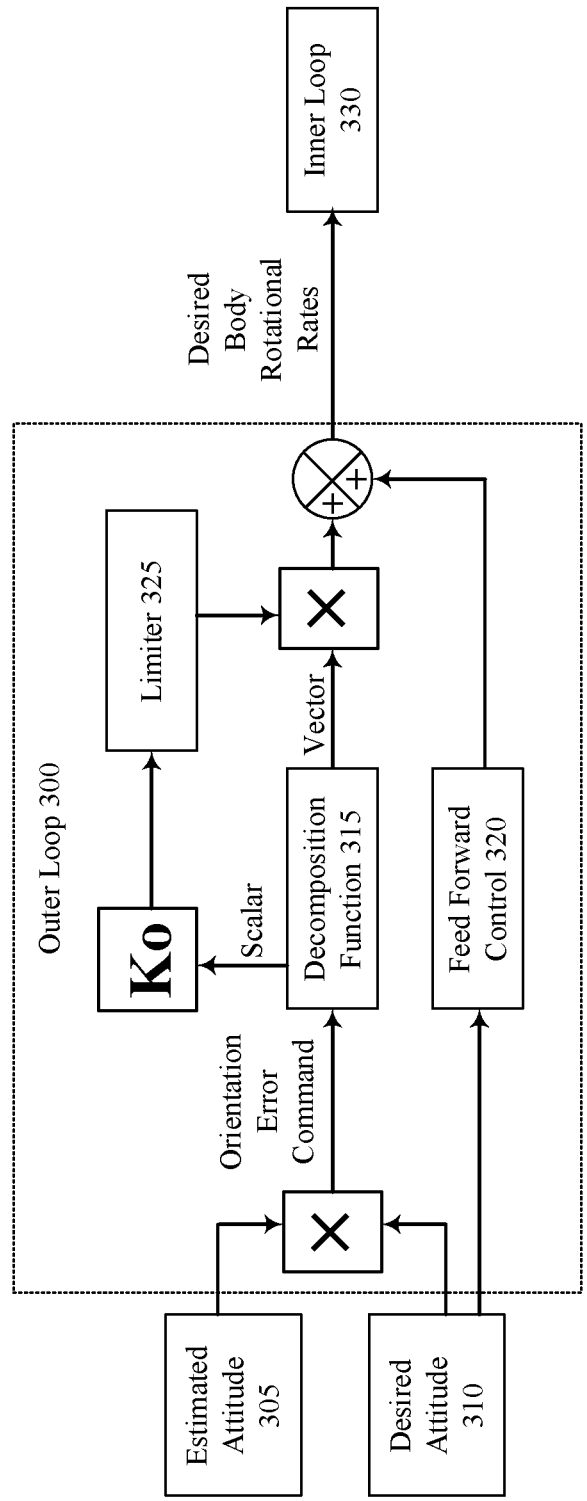
FIG. 3 shows an example of an outer loop of the attitude control system of FIG. 2 in accordance with aspects of the present disclosure.

FIG. 3 shows an example of an outer loop 300 of an attitude control system, such as attitude control system 220 of FIG. 2, in accordance with aspects of the present disclosure. The example shown includes outer loop 300 and inner loop 330.

The control system outer loop 300 may take an estimated attitude 305 and a desired attitude 310 as inputs. Each of these attitudes may be represented by a quaternion. The estimated attitude 305 and the desired attitude 310 may be combined to form an orientation error command, which may be passed to a decomposition function 315. The decomposition function 315 may generate a vector component (i.e., an eigen vector) and a scalar component. The desired attitude 310 may be passed to a feed-forward control 320.

The scalar component may be passed to a limiter 325. The output of the limiter 325 may be combined with the vector component, and this combined product may then be combined with the output of the feed forward control 320 to produce a desired body rotational rate. The desired body rotational rate may be passed out of the control system outer loop 300 to a control system inner loop 330.

Outer loop 300 may be an example of, or include aspects of, the corresponding elements described with reference to FIGS. 2 and 4. Outer loop 300 may include estimated attitude 305, desired attitude 310, decomposition function 315, feed forward control 320, and limiter 325.

Inner loop 330 may be an example of, or include aspects of, the corresponding elements described with reference to FIGS. 2 and 4.

Figure 4:
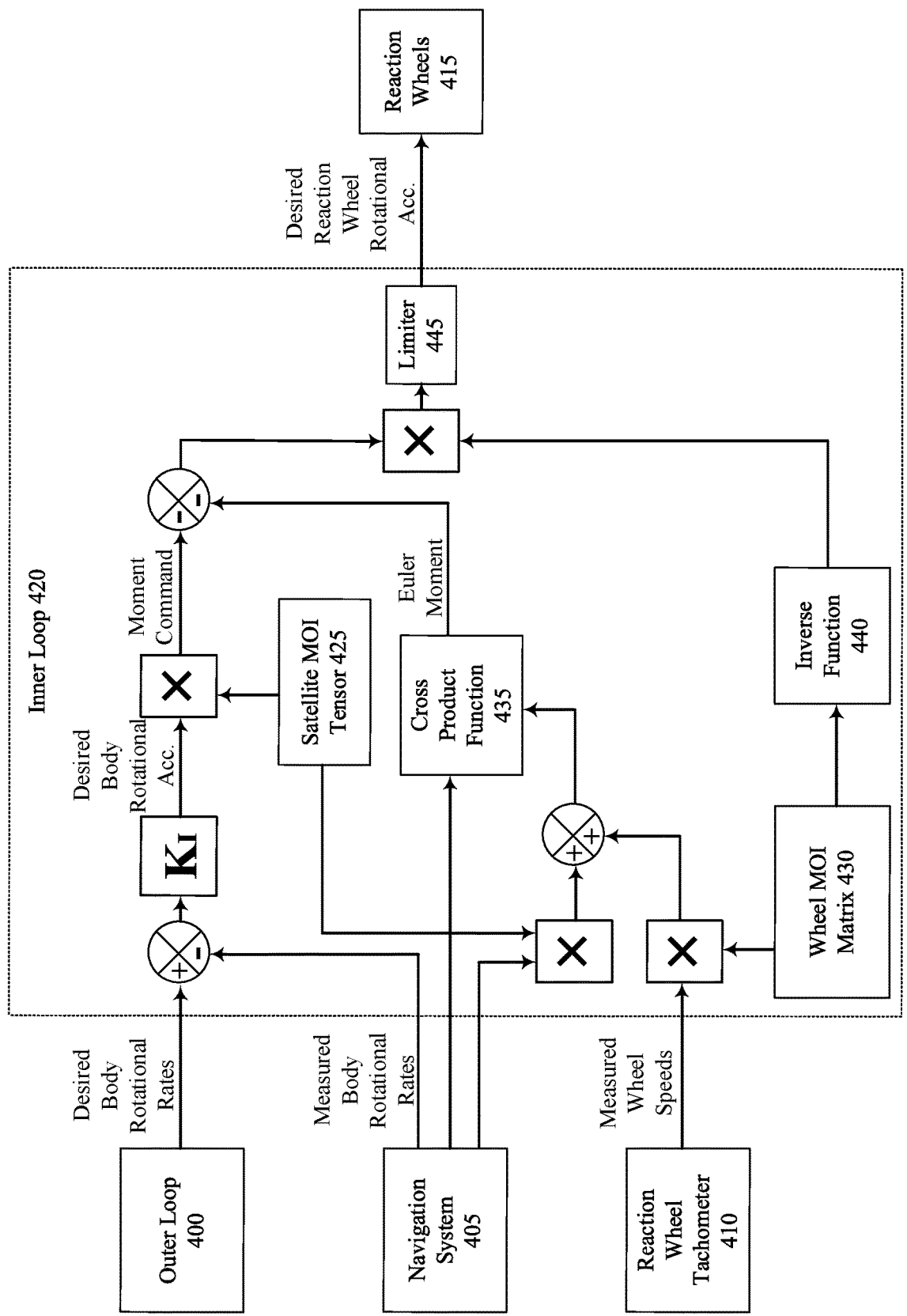
FIG. 4 shows an example of an inner loop of the attitude control system of FIG. 2 in accordance with aspects of the present disclosure.

FIG. 4 shows an example of an inner loop 420 of an attitude control system, such as attitude control system 220 of FIG. 2, in accordance with aspects of the present disclosure. The example shown includes an outer loop 400, a navigation system 405, a reaction wheel tachometer 410, reaction wheels 415, and the inner loop 420.

A desired body rotational rate may be received from the control system outer loop 400. The navigation system 405 may provide one or more measured body rotational rates. The body rotational rates may be combined with the desired body rotational rate to produce a desired body rotational acceleration. The reaction wheel tachometer 410 may provide measured wheel speeds.

A satellite moment of inertia (MOI) tensor 425 may represent the satellite mass moment of inertia. A wheel MOI matrix 430 may be derived from the reaction wheel mass moment of inertia and rotation axes. A cross product function 435 may take as input the measured body rotational rates, and a combination of the measured body rotational rates with the satellite MOI tensor 425 and the measured wheel speeds. The cross product function 435 may output an Euler moment. An inverse function 440 may generate an inverse of the wheel MOI matrix 430.

The satellite MOI tensor 425 may be combined with the desired body rotational acceleration to produce a moment command, which may then be combined with the Euler moment. The result may be combined with the inverted matrix 430 and passed to a limiter 445. The limiter 445 may then output desired reaction wheel rotational accelerations and pass them to the reaction wheels 415.

In one example, the vector of reaction wheel angular acceleration may be given by:

$$\vec{\alpha}_w = I_w^{-1}(-I_b\vec{\alpha}_{b_{des}} - [\vec{w}_b]_x(I_b\vec{w}_b + I_w\vec{w}_w)) \text{ where}$$

$$I_w = \begin{bmatrix} I_1 u_{1x} & I_2 u_{2x} & I_3 u_{3x} & \ldots & I_n u_{nx} \\ I_1 u_{1y} & I_2 u_{2y} & I_3 u_{3y} & \ldots & I_n u_{ny} \\ I_1 u_{1x} & I_2 u_{2z} & I_3 u_{3z} & \ldots & I_n u_{nz} \end{bmatrix},$$

$$[\vec{w}_b]_x = \begin{bmatrix} 0 & -w_{bz} & w_{by} \\ w_{bz} & 0 & -w_{bx} \\ -w_{by} & w_{bx} & 0 \end{bmatrix},$$

$$\vec{\alpha}_{b_{des}} = K_l(\vec{w}_{b_{des}} - \vec{w}_b),$$

And where $I_b$ is the body mass moment of inertia (including the reaction wheels 415), $\vec{w}_b$ is the body frame angular rate vector with respect to inertial space, $\vec{\alpha}_b$ is the body frame acceleration vector with respect to inertial space, $I_w$ is the wheel mass moment of inertia matrix, $\vec{w}_w$ is the vector of reaction wheel angular rotation, and $\vec{\alpha}_w$ is the vector of reaction wheel 415 angular acceleration.

Outer loop 400 may be an example of, or include aspects of, the corresponding elements described with reference to FIGS. 2 and 3.

Navigation system 405, reaction wheel tachometer 410 and reaction wheels 415 may be an example of, or include aspects of, the corresponding elements described with reference to FIGS. 1 and 2.

Inner loop 420 may be an example of, or include aspects of, the corresponding elements described with reference to FIGS. 2 and 3.

Figure 5:
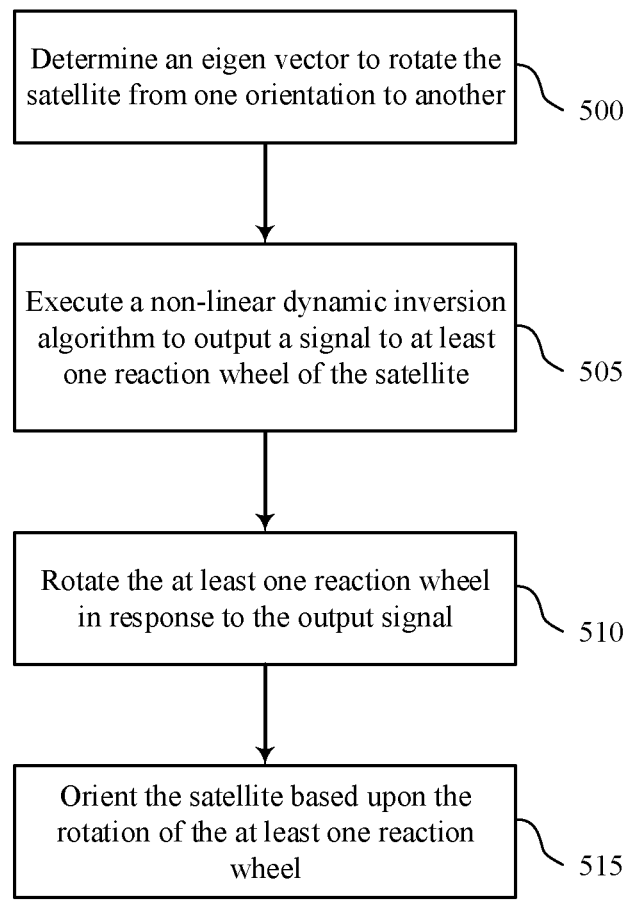
FIG. 5 shows an example of a process for orienting a satellite in accordance with aspects of the present disclosure.

FIG. 5 shows an example of a process for orienting a satellite in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 500, a system may determine an eigen vector to rotate a satellite from one orientation to another. In some cases, the operations of this step may refer to, or be performed by, an outer loop as described with reference to FIGS. 2-4.

At step 505, a system may execute a non-linear dynamic inversion algorithm to output a signal to at least one reaction wheel of the satellite. In some cases, the operations of this step may refer to, or be performed by, an inner loop as described with reference to FIGS. 2-4.

At step 510, a system may rotate the at least one reaction wheel in response to the output signal. In some cases, the operations of this step may refer to, or be performed by, a reaction wheels as described with reference to FIGS. 1, 2, and 4.

At step 515, a system may orient the satellite based upon the rotation of the at least one reaction wheel. In some cases, the operations of this step may refer to, or be performed by, a reaction wheels as described with reference to FIGS. 1, 2, and 4.

Figure 6:
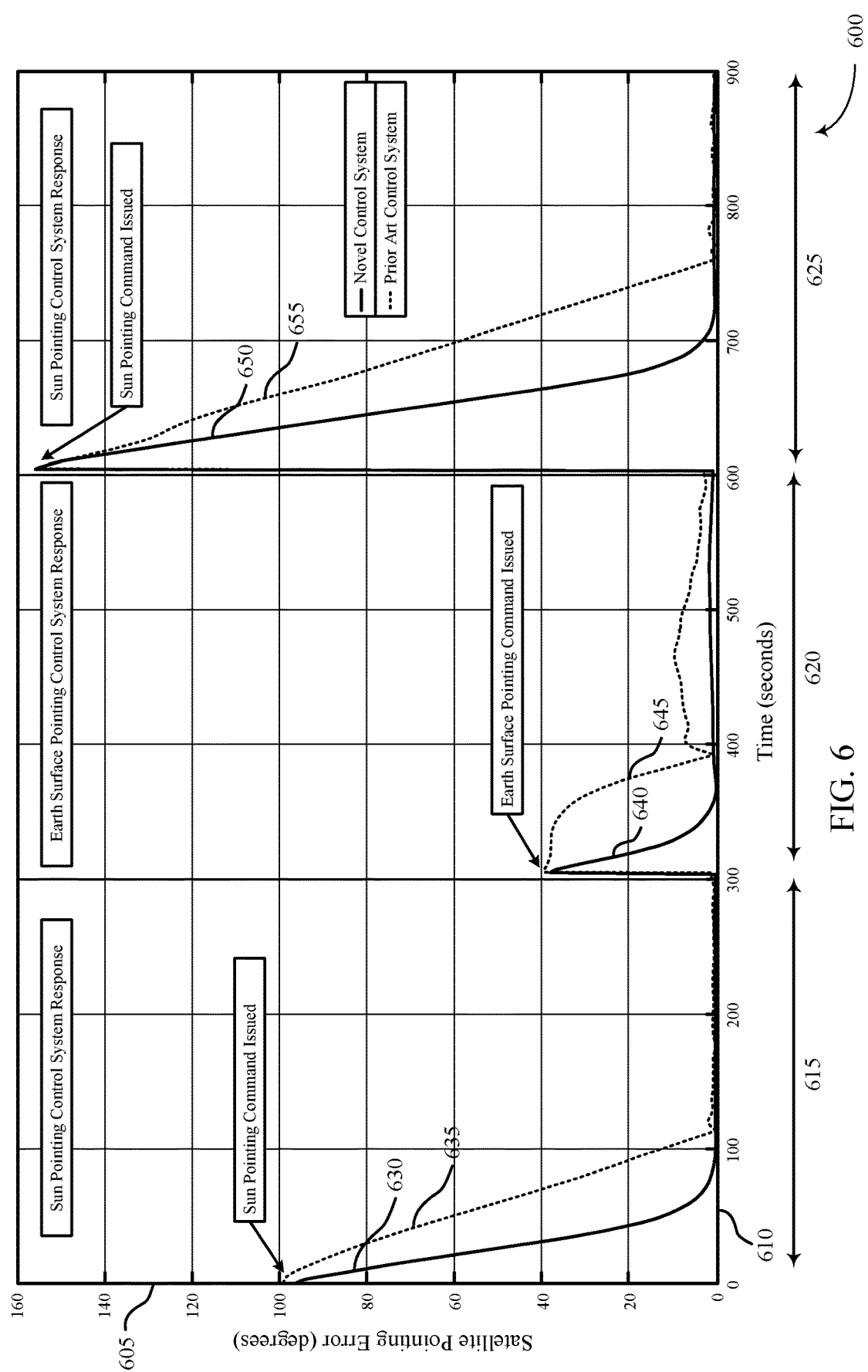
FIG. 6 shows an example of an attitude control system response graph in accordance with aspects of the present disclosure.

FIG. 6 shows an example of an attitude control system response graph 600 in accordance with aspects of the present disclosure. The attitude control system response graph 600 represents an example of the improvement in satellite orientation times for the system disclosed herein when compared to alternative systems that do not implement the disclosed features.

Control system response graph 600 may include vertical axis 605, horizontal axis 610, first sun pointing command 615, first earth surface pointing command 620, second sun pointing command 625, first improved response 630, first comparison response 635, second improved response 640, second comparison response 645, third improved response 650, and third comparison response 655.

The control system response graph 600 represents a simulation study of the attitude control system disclosed herein (the improved responses) to existing technology (the comparison responses). Other simulations (not shown) compared the attitude response of a satellite with the wheels initially to zero speed and another case with the wheels set initially to 5,000 RPM. The attitude response with 5,000

RPM initial wheel speed for the system disclosed herein was identical to the response with zero initial wheel speed. The stored momentum in the wheels was completely accounted for and did not result in unwanted coupling, overshoot, oscillation, or instability.

The vertical axis 605 may represent a satellite pointing error, measured in degrees. The horizontal axis 610 may represent time, in seconds. The first improved response 630 shows a reduced response time for the first sun pointing command 615 in comparison to the first comparison response 635. The second improved response 640 shows a reduced response time for the first earth surface pointing command 620 in comparison to the second comparison response 645. The third improved response 650 shows a reduced response time for the second sun pointing command 625 in comparison to the third comparison response 655.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of satellite orientation control, the method comprising:
    applying with a processing device a satellite orientation control system, the satellite orientation control system comprising a double feedback loop system comprising a first loop and a second loop, wherein:
        the first loop executes to determine an eigen vector to rotate the satellite from one orientation to another and determine desired body rotational rates based on the determined eigen vector, and
        the second loop comprising a non-linear dynamic inversion algorithm that receives as inputs at least the desired body rotational rates of the first loop, a measured reaction wheel speed for at least one reaction wheel of the satellite, and a reaction wheel mass moment of inertia tensor, and outputs a signal to at least one reaction wheel of the satellite;
    rotating the at least one reaction wheel in response to the output signal; and
    orienting the satellite based upon the rotation of the at least one reaction wheel.

2. The method of claim 1, wherein:
the first loop further comprises receiving a desired orientation of the satellite and an estimated orientation of the satellite as inputs.

3. The method of claim 2, wherein:
the first loop further comprises executing a satellite orientation error command based on the estimated orientation of the satellite and the desired orientation of the satellite.

4. The method of claim 3, wherein:
a decomposition function further executes to decompose the satellite orientation error command into a scalar component and a vector component.

5. The method of claim 2, wherein:
the first loop further comprises a feed-forward control system.

6. The method of claim 5, wherein:
the feed-forward control system controls for timing errors between rotation of the at least one reaction wheel and pointing at a target.

7. The method of claim 5, wherein:
the feed-forward control system accounts for motion of tracking dishes, antennae, cameras, robotic arms, and solar arrays associated with the satellite.

8. The method of claim 5, wherein:
the feed-forward control system further comprises receiving the desired orientation as an input.

9. The method of claim 1, wherein:
the second loop further comprises receiving the eigen vector determined from the first loop as an input.

10. The method of claim 1, wherein:
the non-linear dynamic inversion algorithm further receives as an input measured satellite rotation rates from a navigation system associated with the satellite.

11. The method of claim 1, wherein:
the measured reaction wheel speed of the at least one reaction wheel is received from a rotation wheel tachometer associated with the satellite.

12. The method of claim 1, wherein:
the non-linear dynamic inversion algorithm further comprises determining a desired rotational acceleration for the at least one reaction wheel.

13. The method of claim 1, wherein:
the non-linear dynamic inversion algorithm further receives as an input a rotation axis vector of at least one reaction wheel and a mass moment of inertia tensor of the satellite.

14. An apparatus for satellite orientation control, comprising:
    a memory;
    a processor device in communication with the memory and configured to:
        apply a satellite orientation control system, the satellite control system comprising;
        a double feedback loop system comprising a first loop and a second loop, wherein the first loop executes to determine an eigen vector to rotate the satellite from one orientation to another and determine desired body rotational rates based on the determined eigen vector, and the second loop comprising a non-linear dynamic inversion algorithm that receives as inputs at least the desired body rotational rates of the first loop, a measured reaction wheel speed for at least one reaction wheel of the satellite, and a reaction wheel mass moment of inertia tensor, and outputs a signal to at least one reaction wheel of the satellite; and rotate the at least one reaction wheel in response to the output signal; and orient the satellite based upon the rotation of the at least one reaction wheel.

15. The apparatus of claim 14, wherein:
the first loop further comprises receiving a desired orientation of the satellite and an estimated orientation of the satellite as inputs.

16. The apparatus of claim 15, wherein:
the first loop further comprises executing a satellite orientation error command based on the estimated orientation of the satellite and the desired orientation of the satellite.

17. The apparatus of claim 16, wherein:
a decomposition function further executes to decompose the satellite orientation error command into a scalar component and a vector component.

18. The apparatus of claim 15, wherein:
the first loop further comprises a feed-forward control system.

19. The apparatus of claim 18, wherein:
the feed-forward control system controls for timing errors between rotation of the at least one reaction wheel and pointing at a target.

20. The apparatus of claim 18, wherein:
the feed-forward control system accounts for motion of tracking dishes, antennae, cameras, robotic arms, and solar arrays associated with the satellite.

21. The apparatus of claim 18, wherein:
the feed-forward control system further comprises receiving the desired orientation as an input.

22. The apparatus of claim 14, wherein:
the second loop further comprises receiving the eigen vector determined from the first loop as an input.

23. The apparatus of claim 14, wherein:
the non-linear dynamic inversion algorithm further comprises receiving measured satellite rotation rates from a navigation system associated with the satellite.

24. The apparatus of claim 14, wherein:
the non-linear dynamic inversion algorithm further comprises receiving the measured reaction wheel speed of the at least one reaction wheel from a rotation wheel tachometer associated with the satellite.

25. The apparatus of claim 14, wherein:
the non-linear dynamic inversion algorithm further comprises determining a desired rotational acceleration for the at least one reaction wheel.

26. The apparatus of claim 14, wherein:
the non-linear dynamic inversion algorithm further comprises receiving as input a rotation axis vector of at least one reaction wheel and a mass moment of inertia tensor of the satellite.

27. A non-transitory computer readable medium storing code for satellite orientation control, the code comprising instructions executable by a processor to control a satellite to:

determine, at a first loop of a control system, an eigen vector to rotate the satellite from one orientation to another and determine desired body rotational rates based on the determined eigen vector;

execute, at a second loop of a control system, a non-linear dynamic inversion algorithm wherein the algorithm receives as input at least the desired body rotational rates of the first loop, a measured reaction wheel speed for at least one reaction wheel of the satellite, and a reaction wheel mass moment of inertia tensor, and outputs a signal to at least one reaction wheel of the satellite;

rotate the at least one reaction wheel in response to the output signal; and orient the satellite based upon the rotation of the at least one reaction wheel.

28. The non-transitory computer-readable medium of claim 27, wherein:
the first loop further comprises receiving a desired orientation of the satellite and an estimated orientation of the satellite as inputs.

29. The non-transitory computer-readable medium of claim 28, wherein:
the first loop further comprises executing a satellite orientation error command based on the estimated orientation of the satellite and the desired orientation of the satellite.

30. The non-transitory computer-readable medium of claim 29, wherein:
a decomposition function further executes to decompose the satellite orientation error into a scalar component and a vector component.

31. The non-transitory computer-readable medium of claim 28, wherein:
the first loop further comprises a feed-forward control system.

32. The non-transitory computer-readable medium of claim 31, wherein:
the feed-forward control system controls for timing errors between rotation of the at least one reaction wheel and pointing at a target.

33. The non-transitory computer-readable medium of claim 31, wherein:
the feed-forward control system accounts for motion of tracking dishes, antennae, cameras, robotic arms, and solar arrays associated with the satellite.

34. The non-transitory computer-readable medium of claim 31, wherein:
the feed-forward control system further comprises receiving the desired orientation as an input.

35. The non-transitory computer-readable medium of claim 27, wherein:
the further comprises receiving the eigen vector determined from the first loop as an input.

36. The non-transitory computer-readable medium of claim 27, wherein:
the non-linear dynamic inversion algorithm further comprises receiving measured satellite rotation rates from a navigation system associated with the satellite.

37. The non-transitory computer-readable medium of claim 27, wherein:
the non-linear dynamic inversion algorithm further comprises receiving the measured reaction wheel speed of the at least one reaction wheel from a rotation wheel tachometer associated with the satellite.

38. The non-transitory computer-readable medium of claim 27, wherein:

the non-linear dynamic inversion algorithm further comprises determining a desired rotational acceleration for the at least one reaction wheel.

39. The non-transitory computer-readable medium of claim 27, wherein:
the non-linear dynamic inversion algorithm further comprises receiving as input a rotation axis vector of at least one reaction wheel and a mass moment of inertia tensor of the satellite.

* * * * *

UNITED STATES PATENT AND TRADEMARK OFFICE
CERTIFICATE OF CORRECTION

PATENT NO. : 11,279,501 B2
APPLICATION NO. : 16/170157
DATED : March 22, 2022
INVENTOR(S) : Derrick It is certified that error appears in the above-identified patent and that said Letters Patent is hereby corrected as shown below:

In the Claims
Claim 35, Column 12, Line 53, after "the" insert --second loop--.

Signed and Sealed this
Nineteenth Day of July, 2022

Katherine Kelly Vidal
*Director of the United States Patent and Trademark Office*